Sept. 12, 1939. C. L. EKSERGIAN 2,172,817
VEHICLE BRAKING SYSTEM
Filed Sept. 5, 1934
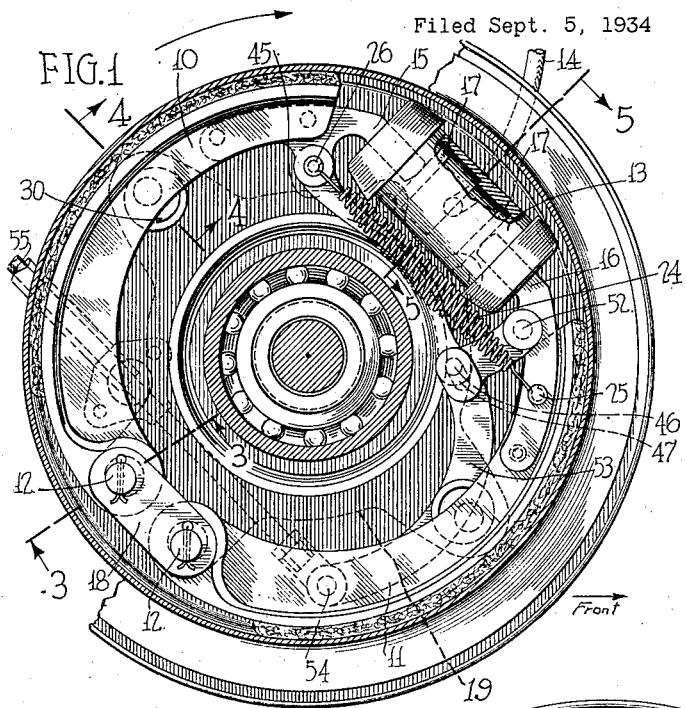
INVENTOR.
CAROLUS L. EKSERGIAN.
BY John P. Tarbox
ATTORNEY.

Patented Sept. 12, 1939

2,172,817

UNITED STATES PATENT OFFICE 2,172,817

VEHICLE BRAKING SYSTEM

Carolus L. Eksergian, Detroit, Mich., assignor to Budd Wheel Company, Philadelphia, Pa., a corporation of Pennsylvania Application September 5, 1934, Serial No. 742,737

1 Claim. (Cl. 188—106)

This invention relates to brakes, and more particularly to vehicle brakes.

Among the objects of this invention are the construction of a brake mechanism of few parts, the construction of a combined mechanical and hydraulic braking system, the construction of a mechanical braking system which may operate independently of a hydraulic system and vice versa, the application of equal braking forces through both shoes irrespective of the self-energizing action of any of the individual shoes per se, the development of a positive method of braking operation for application with knee action or individual wheel suspensions and others not specifically enumerated.

The objects of this invention have been essentially accomplished and an embodiment of the system is herein described:

In the drawing,

Figure 1 is a view in elevation, parts being broken away and in section, of a right rear brake mechanism.

Figure 2 illustrates a similar view of a right front brake mechanism, and

Figures 3, 4 and 5 illustrate similar section views along the corresponding section lines of Figures 1 and 2.

Figure 6 is a section view on line 6—6 of Figure 2.

This invention will be better understood from the following description when considered in connection with the attached drawing and following specification, wherein corresponding ordinals represent like parts of the various figures.

The mechanism of this invention comprises a combined mechanical and hydraulic braking system having four wheel hydraulic brakes and two wheel mechanically operated emergency brakes, both systems operating through the same rear brake shoes by mechanisms capable of operating entirely independently of each other and both systems arranged to provide equal braking forces upon both shoes, irrespective of any self energizing action of the shoes per se. The embodiment of the invention illustrated comprises brake shoes 10 and 11 with adjustable fixed pivots 12 and a fluid actuated cylinder 13 for hydraulically actuating the brake shoes through the intermediation of a flexible connecting conduit 14. The hydraulic cylinders 13 are preferably arranged for differential action, that is, the pistons 17 operating upon the toes 15 and 16 of the brake shoes are of different diameter to provide greater braking force upon the shoe 10 than upon the shoe 11 in the forward direction of rotation or motion of the car, as indicated by the arrows. Due to the self-energizing action of the shoe 11 at ordinary running speeds, this results in the exertion of a substantially equalized braking action by the two shoes. The flexible tube 14 connects with a relatively rigid piping or tubing system upon the chassis and is connected to the necessary supply in master cylinders of the hydraulic system.

Adjustment of the brake shoes by the anchor cams 12 is readily apparent. The nut 20 is released and the pivot 12 turned so that the cam surface 21 spaces the brake shoe 10 closer to or further away from the brake drum 22. The links 18 aid in retaining the brake shoes in alignment with respect to the braking surfaces.

The entire braking mechanism, as far as torque and other loading is concerned, is mounted upon the irregularly shaped member 19 shown in dotted lines in Figure 1. To complete the enclosure of the braking mechanism a dust guard or shield 23 is employed. The brake shoes per se of each and all of the wheels are readily interchangeable and merely require the application of the proper toe and heel securements. In the inoperative position the brakes are held free of the drum by means of a coil spring 24 fastened between the points 25 and 26 respectively on the shoes 10 and 11.

The brake shoe stop adjustments and the clearance limit is obtained through the adjustability of the cam members 30 which have surfaces 31 and 32 positioning the brake shoes with respect to the drum. Adjustment of these cam members is by means of a nut as 33. Variations in the clearance adjustment may be readily accomplished in other ways, as by a more facile adjustment of the cam member 30.

In Figure 5 is illustrated the manner in which the hydraulic cylinder 13 is secured to the member 19 by a plurality of bolts 35. The flexible conduit 14 is secured to the cylinder in suitable manner. The front braking system is essentially the same as that for the rear wheels, and the right and left wheels are similar but in right and left hand arrangements. With regard to the preservation of braking action, an irregularly shaped sheet metal member 40 is secured to the backing plate by means 41 and catches any oil or grease leakage, allowing the same to drain off through the opening 42. This effectively removes the danger of grease coming in contact with the brake shoes.

The system thus far described explains the operation of a four wheel foot brake mechanism.

For emergency braking of the vehicle, the brake shoes 10 and 11 are actuated through a suitable linkage by a steel cable 55 which is connected at one end 54 to a lever 53, which lever at its opposite end is pivotally connected at 52 to the brake shoe 11. A link 45 is pivotally connected at point 26 to brake shoe 10 and connects with lever 53 at the point 46 by a lost motion connection 47. The arrangement of the lever arms of the members 45 and 53 is such as to provide greater braking force to the shoe 10 than to the shoe 11, due to the fact that the self-energizing action of the shoe 11 in the cars travelling in the direction of the arrows compensates for the greater applied force to the shoe 10, thus providing a substantially equalized amount of braking pressure upon both shoes when the drum is rotating forwardly at ordinary driving speeds. The lost motion connection 47 consists of a linkage such that when the emergency brake is not in operation the hydraulic braking system may effectively operate the brakes while in no way interfering with the emergency brake mechanism. Similarly, the emergency braking mechanism being operated, due to the lost motion arrangements, the hydraulic braking system may or may not be in use.

While by way of illustration and example I have described my invention in connection with a preferred embodiment thereof as to structure, and the preferred manner of practicing it, it will be obvious to those skilled in the art, after understanding the foregoing specification, that various changes and modifications may be made without departing from the spirit or scope of the invention and I aim in the appended claim to cover all such modifications and changes.

What I claim is:

In a brake mechanism, the combination of a drum with independent forward and reverse brake shoes and mechanism operable between their toe ends for forcibly pressing said brake shoes against the drum, said mechanism comprising independently acting fluid pressure means and mechanical means, the mechanical means comprising actuating means and a lever-link system, the latter arranged within the brake drum and extending from connection with the toe ends of the brake shoes around the wheel axle to a point of connection with the actuating means near the opposite side of the wheel axle, both said mechanical means and said fluid pressure means being constructed and arranged to exert differential braking pressure upon the shoes with the greater pressure on the reverse shoe, whereby, in conjunction with the servo-action of the forward shoe, the braking forces, in normal forward movement of the vehicle, are substantially equally distributed between the shoes and the wear is consequently equalized.

CAROLUS L. EKSERGIAN.